April 26, 1966  F. THOMPSON  3,247,983
TRUCK UNLOADING STRUCTURE
Filed June 24, 1963  4 Sheets-Sheet 2
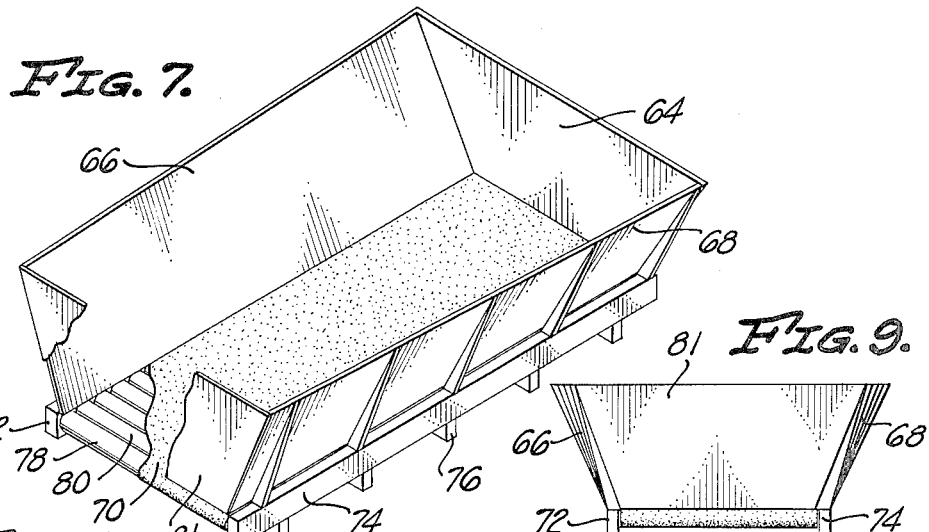
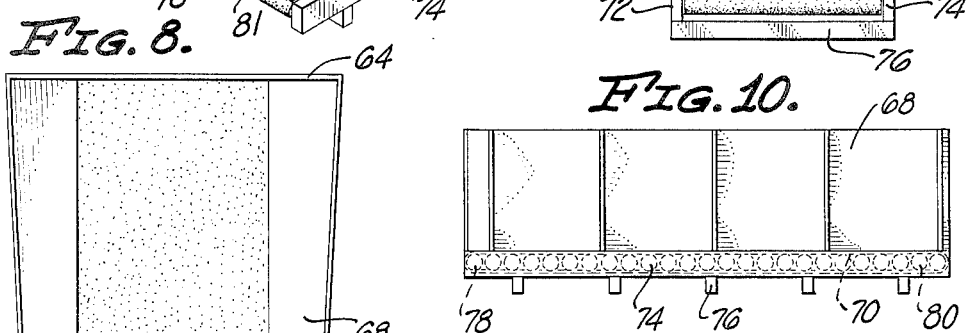
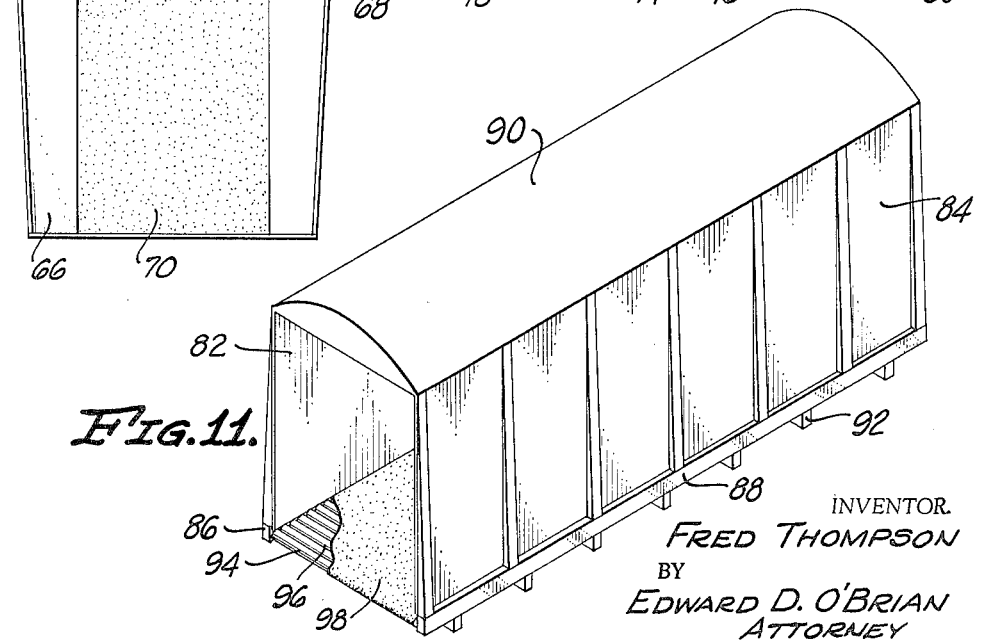
INVENTOR.
FRED THOMPSON
BY
EDWARD D. O'BRIAN
ATTORNEY

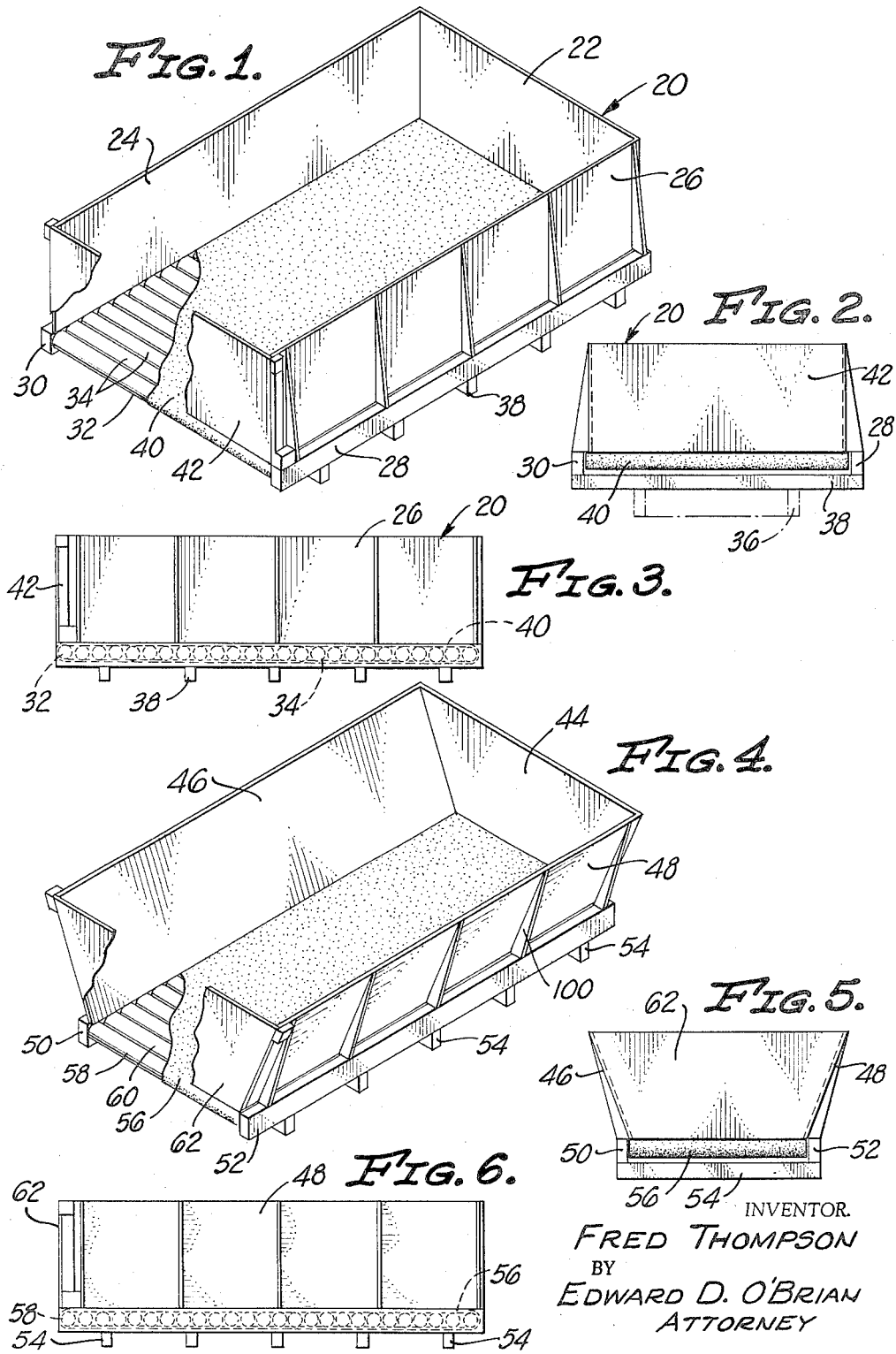

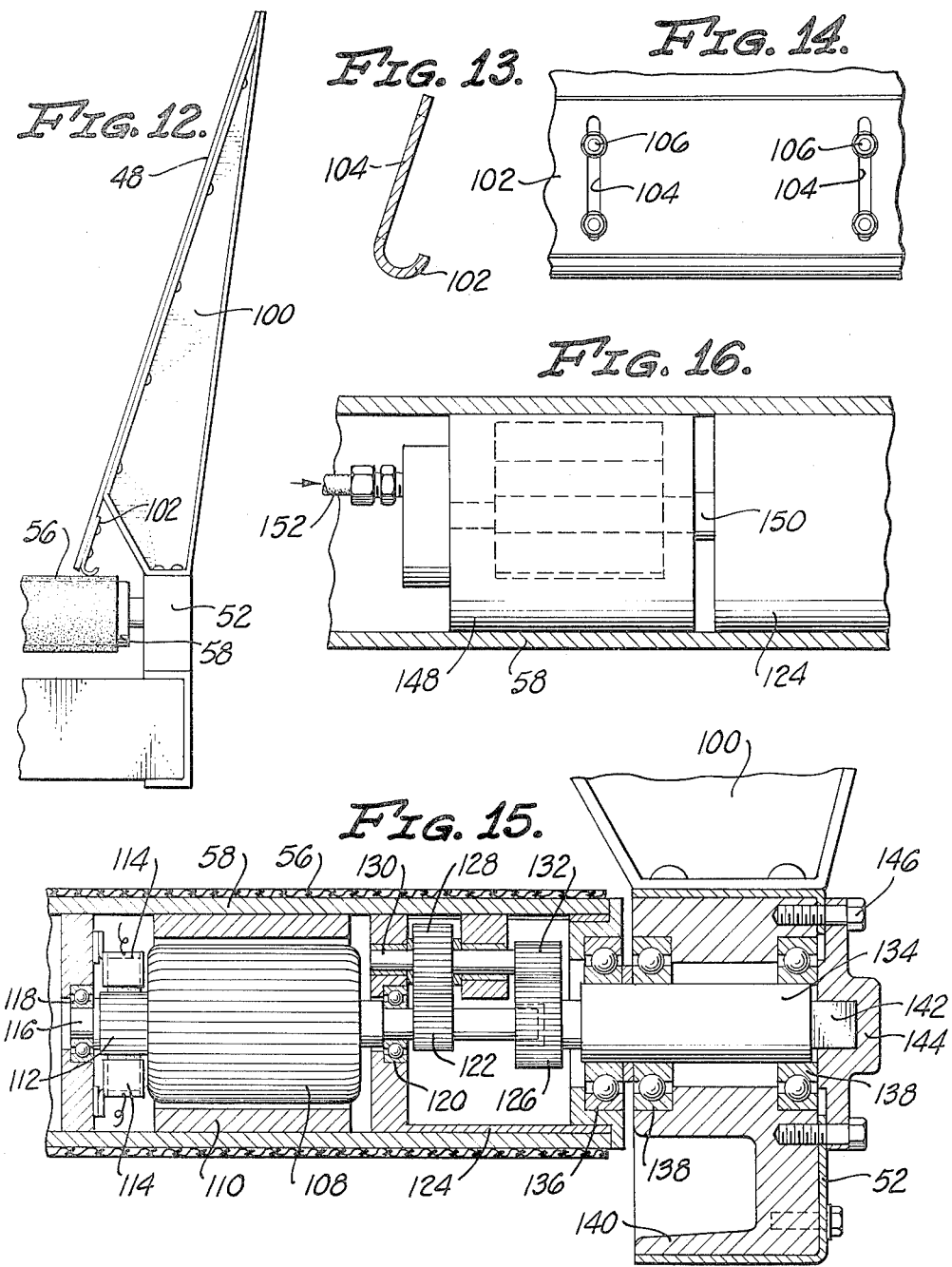

April 26, 1966   F. THOMPSON   3,247,983
TRUCK UNLOADING STRUCTURE
Filed June 24, 1963   4 Sheets-Sheet 4
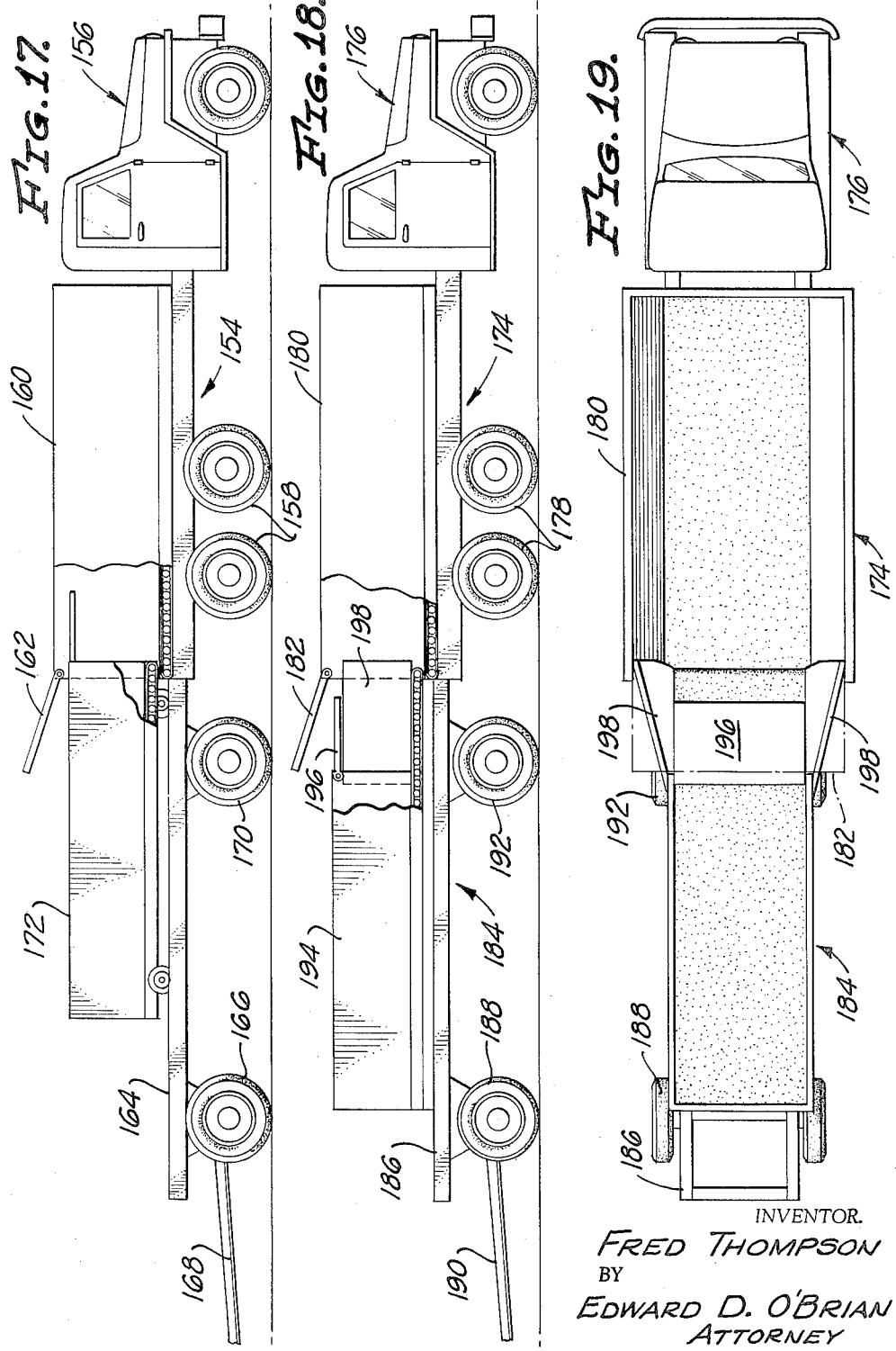
INVENTOR.
FRED THOMPSON
BY
EDWARD D. O'BRIAN
ATTORNEY United States Patent Office 3,247,983
Patented Apr. 26, 1966

3,247,983
TRUCK UNLOADING STRUCTURE
Fred Thompson, 10773 Magnolia, Anaheim, Calif.
Filed June 24, 1963, Ser. No. 290,114
4 Claims. (Cl. 214—38)

This application is directed to truck unloading structures.

During the last two decades the motor truck has come into its own as a vehicle for long distance, and short distance transportation of all of the goods of our economy. Several principal factors have affected the transportation industry to make trucking rise tremendously in importance. These factors include the fact that rate schedules permit more economic transportation by truck of many goods over many routes. A further point of great significance in our modern, fast-geared economy is the fact that trucking is a rapid means for delivery. Truck loads are transported more quickly and delivered sooner at most destinations, as compared to other means of transportation. Another highly important factor favoring the trucking industry is its flexibility in routing and points of pick up and delivery. In short, the modern highway truck can go nearly everywhere.

Primarily considering now bulk materials, in trucking bulk materials normally originate at a particular point. This is because the materials to be shipped by bulk truck load are mined, refined or processed in volume at a particular point. Accordingly, a substantial installation for loading bulk trucks can be installed so that loading may proceed quickly and economically with a minimum of labor. However, the fact that trucks have the ability to go anywhere the load is needed makes it impractical and uneconomic to install complex, expensive unloading facilities. Accordingly, several designs of truck bodies have built-in unloading features.

In the bulk material handling and transportation industry, truck bodies which are lifted from the truck chassis and tilted rearwardly are well-known. These tilt-dump bodies have the particular disadvantage that when lifted they make the truck very top heavy. Should the truck move into soft ground, or run into even a small hole when the body is lifted there is great danger that the truck will fall on its side. Furthermore, because of the necessary structural strength, such tilt-dump bodies add considerable mechanical weight to the entire truck-body combination. Since highway load limits are restrictive, this great weight carried reduces the net load that the truck can carry.

Accordingly it is an object of this invention to provide a new truck body unloading structure which is simple and economical to manufacture and use.

It is another object of this invention to provide a truck unloading body structure which is of light weight so that the net carrying load of the vehicle may be increased.

It is a further object of this invention to provide a truck unloading structure which is useable with bulk or package materials, and is of such nature that the body need not rise from the chassis of the truck so that structural weight is saved and stability is maintained.

It is another object of this invention to provide a conveyor belt truck unloading structure which is suitable for unloading bulk or package materials, and is suitable for moving a load from one truck body to another.

Other objects and advantages of this invention will become apparent from the study of the following specification, the appended claims and the attached drawings in which:

FIG. 1 is an isometric view of a rectangular, open truck body adapted for the carrying of bulk materials and equipped with the unloading structure of this invention;

FIG. 2 is a rear elevation of the structure of FIG. 1;

FIG. 3 is a side elevation of the truck body of FIG. 1;

FIG. 4 is an isometric view of a slope-sided truck body adapted to carry bulk materials, and embodying the unloading structure of this invention;

FIG. 5 is a rear elevation of the truck body of FIG. 4;

FIG. 6 is a side elevation of the structure of FIG. 4;

FIG. 7 is an isometric view of another embodiment of a slope-sided truck body embodying the structure of this invention adapted for the carrying of bulk materials, in which embodiment the sides of the body have a varying slope;

FIG. 8 is a top plan view of the embodiment of FIG. 7;

FIG. 9 is a rear elevation of the embodiment of FIG. 7;

FIG. 10 is a side elevation of the truck body of FIG. 7;

FIG. 11 is an isometric view of a truck body particularly adapted to the transportation of package goods, said body incorporating this invention;

FIG. 12 is a rear elevational detail of the embodiment of FIG. 4;

FIG. 13 is a section of the sealing member of FIG. 12;

FIG. 14 is a side elevational view of the sealing member;

FIG. 15 is a partial section taken through the power roller and the adjacent truck frame of this invention;

FIG. 16 is a section similar to that of FIG. 15 showing another power unit in place;

FIG. 17 shows side elevational embodiment of this invention in a truck and trailer combination;

FIG. 18 shows another side elevational embodiment of this invention in a truck and trailer combination; and FIG. 19 is a plan view of the truck and trailer combination of FIG. 18.

In summary, this invention relates to apparatus for unloading cargo from the body of the truck. The unloading structure is adaptable both to bulk, aggregate materials and to package goods of various sizes. The invention comprises providing a truck floor of a series of closely spaced rollers extending from one side to the other thereof, and providing an endless belt of the conveyor belt variety around the rollers. One of the rollers is powered so that the belt may be moved at various speeds in both the loading and unloading directions. The rollers under the belt are closely spaced so as to prevent excessive belt tension and the rollers are preferably of such length as to extend just beyond the bottom opening of the truck body. The truck body itself may be of such dimensions so as to permit the sidewalls of the truck to be directly supported on the truck frame, or cross beams beneath the sidewalls and the roller supporting rails may rest upon the top of the truck frame. The power roll for driving the belt is preferably driven by a motor mounted internally of one of the end rollers. The motor drive may be electric, hydraulic or pneumatic nature. Manual means is also provided for moving the conveyor belt, should the power means fail. While it is contemplated that this invention is applicable to both trucks and tractor-semi-trailers, it is further contemplated that it is applicable to full trailers. In this application, it is preferred that the trailer be of such height, and such width as to permit it to enter a few inches into the back of the truck body. This arrangement permits the trailer load to be conveyed into the truck body.

The invention will be understood in more detail by reference to the drawings. FIGS. 1, 2 and 3 show a body 20 of standard rectangular construction particularly suited for the carrying of bulk materials. The body 20 is provided with a vertical front wall 22, and vertical side walls 24 and 26. The side walls 26 and 24 are respectively supported on side rails 28 and 30 which support both the side walls and the conveyor rolls. The conveyor rolls comprise a rear, powered conveyor roll 32, and unpowered conveyor rolls 34. The load upon the rolls and the walls defining the truck body is transferred to the truck frame 36 by means of cross beams 38. Continuous conveyor belt 40 passes around the rolls 32 and 34. Tailgate 42 is provided at the rear of the truck body to hold its bulk load therein. The tail gate is of suitable nature to be adjustable to various openings for convenience in unloading the bulk materials.

The truck body of FIGS. 4, 5 and 6 is similar to the one described above, in that it is of open top construction and it is particularly suitable for bulk materials. In this embodiment, the body has a vertical front wall 44 and flat inwardly sloping side walls 46 and 48. The side walls converge inwardly from top to bottom and are supported on side rails 50 and 52, respectively. The side rails 50 and 52 furnish structural support to the walls and may be of such width as to mount directly upon the truck frame, or cross beams 54 may be required to provide structural support and span the side rails 50 and 52, and mount upon the truck frame. The slope-sided construction as shown in these figures permits the use of a narrower conveyor belt 56 together with shorter power roll 58 and support rolls 60. Thus a wide opening at the top of the body is available for loading by shovel or chute, and a narrower lower portion of the body performs the advantageous functions of shortening the span of the rolls 58 and 60 in the bottom and permitting the use of a narrower conveyor belt 56. Furthermore it is advantageous if the side rails 50 and 52 are of such width to fit directly on the truck frame, for this construction conserves tare weight in the whole vehicle. This truck body is also supplied with a tail gate 62 to retain the load during moving, and to permit controlled unloading.

This invention is also shown in a similar embodiment in the truck body disclosed in FIGS. 7, 8, 9 and 10. In this embodiment, the truck body has a vertical front wall 64 and sloping side walls 66 and 68. In this case, the side walls 66 and 68 are spaced at the top more widely at the front than at the rear of the truck body, but at the bottoms adjacent to the conveyor belt 70, they are evenly spaced throughout their entire length from front to rear. This construction provides more volume at the front of the truck body, and accordingly more weight can be carried thereupon. This in turn provides more equalization of the axle loadings, so that more weight can be carried on the front axle. In its construction, also, the side walls 66 and 68 are supported on side rails 72 and 74, respectively. The side rails 72 and 74 may be spaced so that they mount directly upon the truck frame or they may be provided with a cross beam 76 for mounting upon the top of the truck frame. Power roll 78 is mounted between the side rails 72 and 74, at the rear thereof, for the support and powering of the conveyor belt 70 and unpowered rolls 80 are also supported therebetween for the support of the conveyor belt. This body is also provided with a conventional tail gate 81. This configuration is more suitable for obtaining maximum loadings on each axle, and accordingly the maximum permissible net load, for most economical hauling.

Another embodiment of the truck unloading structure of this invention is shown in FIG. 11 which represents the invention as applied to the roofed van-type truck which is particularly applicable for the transportation of packaged goods. The truck body of FIG. 11 is provided with substantially vertical sides 82 and 84 which are mounted on side rails 86 and 88. A front, not shown, extends between the side walls 82 and 84, and top 90 closes the top of this truck body to protect its contents from the weather. Cross beams 92 extend between the side rails 86 and 88 to provide support therefore and these cross beams mount upon the chassis of the truck. Powered conveyor roll 94 extends between the side rails 86 and 88 and is supported thereby, as are unpowered rolls 96. Conveyor belt 98 forms the entire floor of the truck and can be selectively moved in either direction at various speeds for both loading and unloading of the truck contents.

The embodiment of this invention as represented by the slope-sided truck body shown in FIGS. 4, 5 and 6 is shown in more detail in FIGS. 12, 13, 14, 15 and 16. However, while this detailed structure is described with respect to this particular embodiment, it is apparent that the details are applicable to all of the embodiments disclosed in this specification. As is shown in FIG. 12, the side 48 is mounted on gusset plates or buttress plates 100 so that the load on the side 48 is transferred to the side rail 52. At the bottom of the side 48, where it closely adjoins conveyor belt 56, a seal 102 is provided in the form of a long thin strip of spring metal having one edge bent upward in the form of a hook. The bent edge contacts the conveyor belt 56, and the material of the seal 102 is of such resiliency as to maintain such contact yet minimize wear on the conveyor belt. The seal 102 contains slots 104 through which bolts 106 extend, and the bolts 106 carry nuts for the securement thereof. Since the bolts 106 are secured to the truck side 48, tightening of the nuts on the bolts 106 secures the seal 102 with respect to the truck side and the conveyor 56. Slot 104 permits adjustment of the seal 102 for proper sealing force.

From a traction point of view, it is desirable that the power roll 58 be either the foremost or rearmost roll. In FIG. 4, the power roll 58 is shown as being rearmost, and in FIG. 15 it can be seen to contain an electric motor. The electric motor comprises an armature 108 mounted within a fixed field stator 110, the armature being electrically connected by means of commutator 112 and brushes 114. The armature 108 is mounted on armature shaft 116 which is carried within the roll 58 by suitable bearings 118 and 120 mounted in bearing housings in the roll 58.

Armature shaft 116 carries a pinion 122 fixed thereto within double reduction gear case 124. The shaft 116 extends through the pinion 122 to have outward bearing support within the final gear 126. Pinion 122 mates with intermediate gear 128 fixed on shaft 130 supported upon bearings within the gear case 124. The shaft 130 carries the second pinion 132 fixed thereto which mates with the final gear 126. The final gear 126 is in turn fixed to support shaft 134 which is mounted on bearing 136 within roll 58, and bearings 138 mounted in bearing box 140 secured within the side rail 52. The support shaft 134 has a square or splined end 142 which irrotatably engages within cap 144 which in turn is secured to the side rail 52 by bolts 146.

In operation, when the armature 108 and stator 110 of the motor are energized, the rotation of the armature 108 with respect to the stator 110 is conveyed through the gearing in the gear case to the support shaft 134. Since support shaft 134 is held stationary, the roll 58 rotates, thereby driving the conveyor belt 56 engaged therearound. By varying the direction and amount of voltage supplied to the motor, the speed and direction of rotation of the roll 58 can be varied, and accordingly the speed and direction of motion of the conveyor belt 56. The configuration of the supporting shaft 134, its mounting upon the bearings 138 and its cap 144 are such that if there should be a failure in power supply, in the motor itself or in the gear reduction, the cap 144 can be removed and a crank applied to the square or splined end 142 of the shaft 134. Thereupon the truck load can be manually unloaded in an emergency. The conveyor belt supporting rolls 60 are closely spaced through the length of the truck bed, and are supported in the side rails 50 and 52 in a manner similar to the powered conveyor roll 58. They are supported by having a supporting shaft, similar to shaft 134 secured to each end thereof, and this supporting shaft is secured within bearings similar to the bearings 138 mounted within bearing bosses, similar to box 140 within the side rail 52.

An alternative form of motor drive is shown in FIG. 16 wherein the roll 58 is driven by a vane type motor 148 mounted therein and connected by shaft 150 to the double reduction gear box 124. The vane motor 148 is supplied with power fluid through conduit 152 for the actuation thereof. The motor 148 may be arranged either for pneumatic or hydraulic actuation, and accordingly is respectively supplied through the conduit 152 and a possible companion conduit with hydraulic fluid under pressure, or air under pressure. In either case, control of the power fluid to the motor 148 controls the direction of rotation of the roll 58 and its speed of rotation, thereby controlling the speed and direction of motion of the belt 58. Other than by the substitution of the vane type motor 148 for the electrical motor having armature 108, the construction shown in FIG. 16 is identical to that shown in FIG. 15; accordingly, it is not shown in further detail.

Referring now to FIG. 17 another utilization of the invention disclosed herein is shown. In this case a truck 154 has the conventional cab, engine and front axle indicated generally at 156. The engine is connected to drive one or more rear axles 158 for propelling the truck along the highway. A body 160, similar to that shown in FIGS. 4, 5, and 6 is mounted upon the truck 154. The body 160 includes the conveyor unloading structure hereinbefore described. This structure includes the plurality of conveyor rolls, closely spaced along the truck bottom with one of the rolls being powered for motion of the conveyor, and a conveyor belt passing therearound. The truck body 160 is provided with a tail gate 162 that moves adequately out of the way for access to the truck body 160. Furthermore, the truck 160 may be in the form of a tractor and semi-trailer. Some states permit haulage upon the highways of exceptionally long vehicles. In these states it is customary to tow a trailer behind the truck so as to increase the pay load carried per trip.

Such a trailer is shown at 164. The trailer conventionally includes steerable front wheels 166 which are steered and towed by means of a tongue 168 which is connected to the rear of the truck 154 during normal highway hauling. The trailer is additionally carried upon conventional non-steerable rear wheels 170. Mounted upon the trailer 164, on tracks thereon is a body 172, which in this case is of rectangular section as is shown in FIGS. 1, 2 and 3. This body 172 is mounted upon the rails of the trailer frame 164 so that it may be moved from a central position where the loads on the front or rear axles 166 and 170 are equalized, to a rear position, as is shown in FIG. 17. In some cases it is possible to discharge directly from the trailer body 172 while it is towed behind the truck. The trailer body 172 includes the conveyor mechanism including powered and idler rolls, and conveyor belt in the bottom thereof, and accordingly its load can be discharged by actuating the belt therein. However, in some cases it is necessary for the load in the trailer body 172 to be transferred to the body 160 on its towing truck. These situations are those where it is necessary to back up into position before the beginning of discharge, or to back up during the discharge of the load. In these cases, after the load in the body 160 is discharged, the load in the trailer body 172 is transferred therein. This is accomplished by moving the body 172 rearwardly on the trailer frame 164 until it extends slightly therefrom. Thereupon the truck 154 is backed up so that its body 160 underlaps the trailer body 172. Then both the conveyor belt in the body 160 and in the trailer body 172 are actuated. The conveyor belt in the body 160 moves forward to move the load into this truck body, while the conveyor belt in the trailer body 172 is actuated to move its load out of the trailer body 172. This effectively transfers the bulk material load and after the transfer has taken place, the trailer body is moved centrally back onto the trailer frame 164 for highway haulage. The truck 154 discharges its second load, the one received from the trailer 164, reconnects the trailer 164 and is ready for its empty return run.

Referring now to FIGS. 18 and 19, truck 174 is seen therein. Truck 174 is identical to truck 154 and it includes a cab and engine 176, drive axles 178 and body 180. The body 180 is equipped with a tail gate 182. Similarly to the truck 154, the truck 174 may be of tractor semi-trailer construction or may be of the bulk materials truck design as shown in the drawings. The body 180 thereof is equipped with the conveyor belt floor, as hereinbefore described, for the purpose of loading and unloading bulk materials. The truck 174 is adapted to tow a trailer 184 which comprises a frame 186. The frame 186 has a steerable front axle 188 which is steered by means of tongue 190, which also tows the trailer 184. The trailer has a rear axle 192, and the axles 188 and 192 are spaced in such a manner as to permit maximum axle loading in accordance with applicable state highway law. The bulk material body 194 is mounted on the frame 186 at the center thereof to equalize axle loadings. The body 194 is equipped with the hereinbefore recited conveyor belt bottom for convenience in loading or unloading. The body is equipped with a tail gate 196 for retention of the contents of the body during transportation. The conveyor belt in the trailer body 194 extends rearward along the length of the frame 186 to the rear termination thereof, so that the body 194 need not be moved from its central position during discharge of the load. Side boards 198 are provided at each side of the conveyor belt behind the tail gate 196 to keep the load from spilling over the edges thereof.

This body configuration is adaptable to two important uses. First, the trailer load may be discharged while being towed behind the truck 174, whereby material transfer time is saved. Accordingly, both the truck and trailer loads may be discharged by actuating the appropriate conveyor belts while the truck moves forward while towing the trailer. This method of discharge is particularly suitable for those jobs where it is not necessary to back up the entire unit. When it is necessary to back up for discharge into areas which are otherwise inaccessible, the trailer 184 is unhitched from the truck 174, and the truck 174 discharges its load. Thereupon the truck is backed around until the ends of the respective conveyor belts are overlapped, as shown in FIGS. 18 and 19. While in the overlapping position, the conveyor belt of the truck body 180 is energized to move forward, while the conveyor belt of the trailer body 194 is energized to move its load out of the body. Thus the trailer load is conveyed to the truck body, and when transfer is complete the truck 174 moves away to discharge its new load.

The use of the conveyor belt system of this invention for the loading and unloading of bulk materials permits a higher net weight of such material to be hauled upon the highway. State laws limit total truck loadings to particular maximum values of load per axle. The unloading structure of this invention is lighter then previous types thereby permitting a higher net loading, since the tare weight is reduced. The belt used is of standard conveyor belt construction, and the protective surface material can be chosen to suit the types of material handled thereby. A rubber covered cord or canvass belt is preferred, but the particular belt construction is not part of this invention and it is anticipated that any conveyor belt type of construction suitable for handling the particular bulk material in other environments will be suitable for use in the truck body.

This invention, having been described in its preferred embodiment, is apparent from this specification that it is adaptable to numerous other configurations and embodiments within the skill of the routine engineer. Accordingly the scope of this invention is defined by the scope of the appended claims.

I claim:
1. A truck arranged to transport materials, said truck including a body to retain the material during transportation, said body including walls and a conveyor belt at the bottom of said body, said conveyor belt being mounted on rolls to support the weight of material adapted to be placed upon said conveyor belt, said rolls being mounted for rotation so that said conveyor belt may be moved to move the material with respect to said body, side rails on said body, said side rails carrying means to mount said rolls for rotation, said rolls being arranged transversely between said side rails, one of said rolls containing a motor within the interior thereof, said motor being connected to rotate said roll with respect to said side rails;

a trailer connected to said truck to be drawn thereby, said trailer being arranged to cooperate with said truck to transfer materials from said trailer to said truck, said trailer including a body having walls and a floor and said trailer body, said floor comprising a conveyor belt, rolls mounted transversely on said trailer to support said conveyor belt, said walls including side walls in said trailer body, side rails in said trailer body, said side rails supporting said side walls, said side rails rotatably supporting said rolls, one of said rolls being powered to convey materials with respect to said trailer body, said conveyor belt being of such dimensions and so positionable as to be positionable within said truck body so that actuation of the conveyor belt within said truck body and actuation of said conveyor belt within said trailer body conveys materials from said trailer body into said truck body.

2. The structure of claim 1 wherein said trailer body is fixed to said trailer and said conveyor belt extends beyond said trailer body whereby materials may be conveyed on the conveyor belt beyond said trailer body.

3. The structure of claim 1 wherein said trailer body is movable with respect to said trailer so that when said trailer is arranged for transportation, said trailer body is substantially centrally mounted upon said trailer and when said trailer body is arranged for discharge into said truck body, said trailer body extends past the trailer.

4. A highway vehicle having road engaging wheels and having a body having side walls and a floor;
said body having a length corresponding in direction to the direction of motion of said vehicle, side rails in said body, said side rails extending in the direction of the length of said body, said side walls being supported upon said side rails;
said floor being in the form of a conveyor comprising a conveyor belt having a substantially flat exterior surface, rolls supporting said conveyor belt, said rolls being supported by said side rails and extending substantially at right angles to the directional length of said body;
one of said rolls being a power roll adapted to move said conveyor belt to act in the loading and unloading of materials from said body, said power roll having a drive shaft connected thereto, a motor positioned within the interior of said power roll, said motor being an electric motor, a gear drive mechanism connected between said motor and said drive shaft so that rotation of said motor rotates said roll with respect to said drive shaft;
selective means connected to said drive shaft to selectively rotatably restrain said drive shaft with respect to said side rail, drive attachment means upon said drive shaft away from said motor drive so that said drive attachment means may be driven externally of said body when said selective means is disengaged so that said power roll may be rotated by external drive means when said motor drive within said roll is inoperative.

References Cited by the Examiner
UNITED STATES PATENTS

| | | | |
|---|---|---|---|
| 1,497,622 | 6/1924 | Weber | 214—83.36 |
| 1,945,532 | 2/1934 | Lima | 214—83.36 |
| 2,270,345 | 1/1942 | Rousso | 214—83.36 |
| 2,765,937 | 10/1956 | Elfes | 214—83.36 |
| 2,997,608 | 10/1961 | Musser. | |
| 3,150,768 | 9/1964 | Muller | 198—203 |

GERALD M. FORLENZA, *Primary Examiner.*

MORRIS TEMIN, HUGO O. SCHULZ, *Examiners.*